United States Patent
Apunevich et al.

[11] Patent Number: 6,087,616
[45] Date of Patent: Jul. 11, 2000

[54] METHOD FOR THE PLASMIC ARC-WELDING OF METALS

[76] Inventors: Alexandr Ivanovich Apunevich, Moscow; Evgeny Ivanovich Titarenko, Zelenograd, both of Russian Federation

[21] Appl. No.: 09/214,740

[22] PCT Filed: Jul. 11, 1996

[86] PCT No.: PCT/RU96/00188

§ 371 Date: Jan. 11, 1999

§ 102(e) Date: Jan. 11, 1999

[87] PCT Pub. No.: WO98/02270

PCT Pub. Date: Jan. 22, 1998

[51] Int. Cl.[7] .................................................. B23K 10/00
[52] U.S. Cl. .............................. 219/121.46; 219/121.45; 219/121.51; 219/121.59
[58] Field of Search .................... 219/121.39, 121.44, 219/121.45, 121.46, 121.48, 121.51, 121.52, 75, 121.59

[56] References Cited

U.S. PATENT DOCUMENTS

| | | | |
|---|---|---|---|
| 3,567,898 | 3/1971 | Fein | 219/121.39 |
| 3,830,428 | 8/1974 | Dyos | 219/121.5 |
| 4,311,897 | 1/1982 | Yerushalmy | 219/121.5 |
| 4,531,043 | 7/1985 | Zverina et al. | 219/121.5 |
| 5,609,777 | 3/1997 | Apenuvich et al. | 219/121.48 |
| 5,660,743 | 8/1997 | Nemchinsky | 219/121.5 |

OTHER PUBLICATIONS

"Microplasma–arc Welding", B. Paton, Ukraine, Kiev; Naukova dimka publishers, 1979 p. 19–21.

*Primary Examiner*—Mark Paschall
*Attorney, Agent, or Firm*—Collard & Roe, PC.

[57] ABSTRACT

In a method for the plasmic welding of metals with a straight-polarity direct electric arc used as a plasma-producing medium is water vapor generated directly in the welding torch by virtue of heat energy evolved by the pilot arc on the nozzle—anode, and the resultant plasma jet is controlled by varying the pilot arc current.

3 Claims, 1 Drawing Sheet

METHOD FOR THE PLASMIC ARC-WELDING OF METALS

TECHNICAL FIELD

The present invention relates to methods of plasma-arc welding of metals and is applicable in mechanical engineering, automotive industry, construction engineering, and many other industries.

BACKGROUND ART

A method of plasma-arc welding of metals using the so-called constricted arc (cf. a textbook "Microplasma-arc welding" ed. by B. Ye. Patton, Ukraine, Kiev, "Naukova dumka" publishers, 1979, pp.19–21 (in Russian). The essence of the method resides in that the arc discharge occurs in a stream of inert gas between the cathode of the plasma-arc welding torch of a plasmatron and the workpiece—anode, while the diameter of the arc discharge is restricted to the torch nozzle passage. Insofar as direct arc striking between the electrode and the workpiece across a narrow nozzle passage is difficult, first a pilot arc is initiated between the electrode and the torch nozzle—anode, whereupon an inert gas is fed thereto.

While being under pressure said gas emerges from the outlet of the nozzle—anode to establish a plasma jet due to constriction of the pilot arc. As soon as the plasma jet contacts the workpiece the main arc is started. In this case the pilot arc may persist, thus stabilizing the main arc under low-amperage conditions. While controlling the consumption rate of the plasma-producer gas, one can vary the pressure exerted on the molten weld pool and hence the depth of penetration of the workpiece—anode.

The afore-discussed known method is instrumental in obtaining quality weld joints; however, provision of an external inert-gas source involves some operational inconveniences in carrying said method into effect, while high production cost of the inert gas and considerable expenses for charging gas bottles and their delivery impose substantial limitation on practical applicability of the aforementioned method of plasma-arc welding.

DISCLOSURE OF THE INVENTION

The present invention is aimed at eliminating the aforementioned disadvantages of the known method.

The essence of the proposed method of plasma-arc welding with a direct electric arc resides in using water vapor as the plasma-producer gas, the straight (normal) polarity of the main arc being mandatory. Vapor can be generated directly in the welding torch due to heat energy released by the pilot arc. The plasma jet may be controlled to suit the required weld penetration by varying the pilot arc amperage.

It should be noted that known from prior art are plasma-arc torches, wherein used as the plasma-producing medium is water vapor generated immediately in the torch due to water evaporation under the effect of high temperatures of the electrodes (cf. PCT/RU93/00053 published on Sep. 1, 1994 under #WO94/19139). However, said torches have not so far been used for welding of metals with direct electric arc stricken between the torch cathode and the workpiece.

BRIEF DESCRIPTION OF THE INVENTION

FIG. 1 shows the plasma welding system as disclosed.

DETAILED DESCRIPTION OF THE INVENTION

Figure 1:
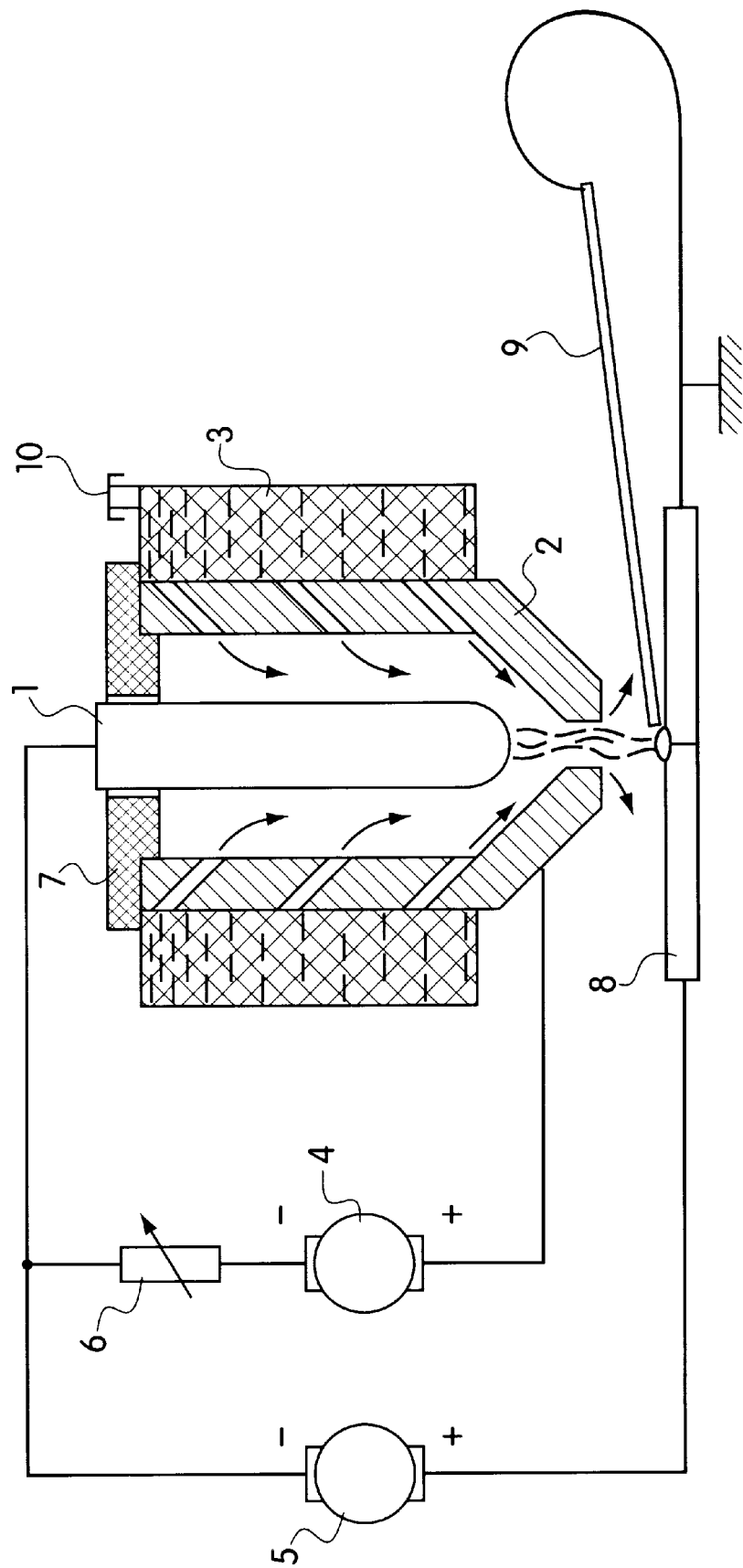

A drawing appended to the present specification presents the device for carrying into effect the welding method, according to the present invention. The device comprises a plasma-arc welding torch which incorporate a cathode 1, a nozzle—anode 2 provided with passages for a plasma-producing medium, a container 3 filled with a moisture absorbent material, and a pilot arc power source 4, a direct arc power source 5, and a pilot arc current regulator 6. The torch is provided with an insulating pressure-tight cover 7. Used as a moisture absorbent material may be kaolin wool, carbon fabric, or carbon felt.

The device operates as follows.

An inlet 10 of the container is opened and water is filled therein, whereupon and the inlet 10 of the container 3 is closed. Then a voltage is applied from the pilot arc power source 4 to the cathode 1 and the nozzle—anode 2.

Next the pilot arc is initiated by, e.g., reciprocating the cathode 1 till contacting the nozzle—anode 2. The heat energy released by the pilot arc on the nozzle—anode 2 evaporates the water held in the container 3. The resultant water vapor enters the discharge chamber via the passages of the nozzle—anode 2 and emerge through the central nozzle opening, thus drawing the arc-gaseous column. The water vapor is then heated to high temperatures due to constriction of the arc-gaseous column in the opening of the nozzle—anode 2, and thus goes into the plasma state to establish a plasma jet at the outlet of the nozzle—anode 2.

Once the torch has got steady-state temperature conditions, a voltage is applied from the power source of the direct arc 5 to the cathode 1 and the metal 8 being welded, the pilot arc plasma jet is directed to the weld area, and the distance between the nozzle—anode and the metal being welded is decreased until a direct arc is started between the cathode 1 and the metal 8 being welded.

Thus, the resultant direct arc space-stabilized with the plasma jet of the pilot arc welds the metal by its fusion. The depth of fusion of the metal and the degree of stabilization of the direct arc are changed using the current regulator of the pilot arc 6 by so selecting the regulator position as, on the one hand, to prevent molten metal from being blown out of the weld puddle and on the other hand, to provide a steady stabilization of the direct arc position.

Whenever a filling material 9 is used, it is electrically connected to the metal being welded and is brought into the plasma jet as necessary, wherein said material is fused under the action of the direct arc and fills the weld puddle formed on the surface of the metal being welded.

Industrial Applicability

An experienced mode of the device made according to the drawing appended to the present specification was tested by welding steel structures with a sheet thickness of 4–5 mm carrying out the aforelisted operations in the specified sequence at a pilot arc current of 3–4 A and a direct arc current of 7–10 A, the depth of fusion being 3–4 mm.

We claim:

1. A method of plasma-arc welding of metals, comprising the following steps:

striking a pilot electric arc between the electrode and the nozzle, said nozzle comprising an anode of the plasma-arc welding torch, approaching a plasma-producing medium to the arcing zone of said pilot arc, constricting the pilot arc with said plasma-producing medium in the nozzle of the welding torch, and producing a plasma jet as a result, establishing the main electric arc between the electrode of the plasma-arc welding torch and the metal being welded, stabilizing the main electric arc with said plasma jet and fusing the metal with said stabilized main electric arc, characterized in that used as the plasma-producing medium is water vapor and welding of metals is effected with a straight polarity of the main electric arc.

2. A method according to claim 1, characterized in that used as the plasma-producing medium is water vapor generated directly in the plasma-arc welding torch by virtue of heat energy evolved by the pilot arc.

3. A method according to claim 1 characterized in that the plasma jet is controlled by varying the value of the pilot arc current.

* * * * *